(12) United States Patent
Mehta et al.

(10) Patent No.: US 9,479,989 B1
(45) Date of Patent: Oct. 25, 2016

(54) CONTROLLING HANDOVER BASED ON CARRIER-AGGREGATION POLICIES

(71) Applicant: Sprint Spectrum L.P., Overland Park, KS (US)

(72) Inventors: Dhaval Mehta, Herndon, VA (US); Siddhartha Chenumolu, Broadlands, VA (US); Jasinder P. Singh, Olathe, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 154 days.

(21) Appl. No.: 14/496,930

(22) Filed: Sep. 25, 2014

(51) Int. Cl.
*H04W 36/28* (2009.01)

(52) U.S. Cl.
CPC .................. *H04W 36/28* (2013.01)

(58) Field of Classification Search
None
See application file for complete search history.

(56) References Cited

U.S. PATENT DOCUMENTS

| | | | |
|---|---|---|---|
| 2012/0302245 A1* | 11/2012 | Huang | H04W 36/0027 455/438 |
| 2013/0142064 A1 | 6/2013 | Dinan | |
| 2013/0165126 A1 | 6/2013 | Wei | |
| 2015/0141014 A1* | 5/2015 | Huang | H04W 36/0083 455/436 |
| 2015/0173009 A1* | 6/2015 | Vallath | H04W 48/18 370/329 |
| 2015/0327094 A1* | 11/2015 | Lee | H04L 5/0035 370/252 |

* cited by examiner

*Primary Examiner* — Charles C Jiang
*Assistant Examiner* — George Atkins, Jr.

(57) ABSTRACT

A base station or a UE may use another base station's carrier-aggregation policy for a cell provided by the other base station as a basis to control handover of the UE from being served by the base station to being served by the other base station. As one example, a first base station may use a second base station's carrier-aggregation policy for at least one of multiple co-located cells provided by the second base station as a basis to control handover of the UE from being served by the first base station to being served by the second base station. As another example, a UE may use a second base station's carrier-aggregation policy for one of multiple co-located cells provided by the second base station as a basis to control cell reselection.

15 Claims, 6 Drawing Sheets

```
CELL ID: 1
    BANDWIDTH: 10 MHz
    CARRRIER-AGGREGATION POLICY:
        PCELL: YES
        # SCELLS: 1
        SCELL ID(s): 2
        MAX BANDWIDTH: 20 MHz

CELL ID: 2
    BANDWIDTH: 10 MHz
    CARRRIER-AGGREGATION POLICY:
        PCELL: YES
        # SCELLS: 2                      50
        SCELL ID(S): 1, 3
        MAX BANDWIDTH: 40 MHz

CELL ID: 3
    BANDWIDTH: 20 MHz
    CARRRIER-AGGREGATION POLICY:
        PCELL: YES
        # SCELLS: 1
        SCELL ID(S): 1
        MAX BANDWIDTH: 30 MHz
```

CELL ID: 1
    BANDWIDTH: 10 MHz
    CARRRIER-AGGREGATION POLICY:
        PCELL: YES
        # SCELLS: 1
        SCELL ID(s): 2
        MAX BANDWIDTH: 20 MHz

CELL ID: 2
    BANDWIDTH: 10 MHz
    CARRRIER-AGGREGATION POLICY:
        PCELL: YES
        # SCELLS: 2
        SCELL ID(S): 1, 3
        MAX BANDWIDTH: 40 MHz

CELL ID: 3
    BANDWIDTH: 20 MHz
    CARRRIER-AGGREGATION POLICY:
        PCELL: YES
        # SCELLS: 1
        SCELL ID(S): 1
        MAX BANDWIDTH: 30 MHz

Fig. 4

CONTROLLING HANDOVER BASED ON CARRIER-AGGREGATION POLICIES

BACKGROUND

Unless otherwise indicated herein, the description provided in this section is not itself prior art to the claims and is not admitted to be prior art by inclusion in this section.

In a wireless communication system, a base station may provide one or more coverage areas, such as sectors, in which the base station may serve user equipment devices (UEs), such as cell phones, wirelessly-equipped personal computers or tablets, tracking devices, embedded wireless communication modules, or other devices equipped with wireless communication functionality. In general, each coverage area may operate on one or more carriers each defining a respective bandwidth of coverage, and each coverage area may define an air interface providing a downlink for carrying communications from the base station to UEs and an uplink for carrying communications from UEs to the base station. The downlink and uplink may operate on separate carriers or may be time division multiplexed over the same carrier(s). Further, the air interface may define various channels for carrying communications between the base station and UEs. For instance, the air interface may define one or more downlink traffic channels and downlink control channels, and one or more uplink traffic channels and uplink control channels.

In accordance with the Long Term Evolution (LTE) standard of the Universal Mobile Telecommunications System (UMTS), a base station (e.g., an eNodeB) may provide multiple sectors. In each sector, the base station may provide service on one or more carriers spanning 3 MHz, 5 MHz, 10 MHz, 15 MHz, or 20 MHz. Each carrier in a particular sector defines a "cell". For example, if a base station provides three sectors and provides service on two carriers per sector, the base station provides six cells. In some examples, there could be multiple cells at the same physical location, each provided by the same base station, and each being on a different carrier.

In an LTE system, each eNodeB has a global eNodeB ID and each sector of an eNodeB has a sector ID. Further, since each carrier in a particular sector defines a cell, each cell of a sector has a cell ID. Thus, at the system level, each combination of global eNodeB ID and cell ID defines a globally unique identifier for a cell. This globally unique identifier is referred to as an Evolved Universal Terrestrial Radio Access Network (E-UTRAN) cell global identifier (ECGI). At the physical level, each cell provided by an eNodeB also has a physical cell identifier (PCI) that is identifiable by a UE. While an ECGI is globally unique within a public land network, there are only 504 possible PCIs. Thus, PCIs are likely to be repeated many times throughout a public land mobile network. In practice, each eNodeB may store a mapping between the PCI and cell ID of each of its cells.

Further, an LTE system may support handover of a UE from one cell to another. For instance, when a first eNodeB is serving a UE and the UE detects sufficiently strong coverage from a cell of a second eNodeB, the UE may send a report to the first eNodeB indicating the detected PCI of the cell of the second eNodeB. The first eNodeB may in turn determine if applicable handover thresholds are met. If so, the first eNodeB may engage in handover signaling via an interface with the other eNodeB to orchestrate handover of the UE to the reported cell.

In LTE, the handover signaling may occur over an interface used to interconnect eNodeBs, such as an X2 interface. When an X2 interface is provisioned between two eNodeBs, each eNodeB shares with the other neighbor eNodeB (i) its eNodeB global ID and (ii) each of its cell IDs and corresponding PCIs. Thus, an eNodeB may have a record of a neighbor eNodeB's cell IDs and, for each cell, the corresponding PCI. In addition, eNodeBs may use the X2 interface to report their respective load to their neighboring eNodeBs on a per-cell basis.

Furthermore, a revision of LTE known as LTE-Advanced now permits an eNodeB to serve a UE with "carrier aggregation," by which the eNodeB schedules bearer communication with the UE on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between an eNodeB and a UE using a single carrier is 20 MHz. Using carrier aggregation, an eNodeB may increase the maximum bandwidth to up to 100 MHz by aggregating up to five carriers. Each aggregated carrier is referred to as a component carrier. Further, when multiple carriers are aggregated, one of the component carriers may be defined as a primary cell ("PCell") and the remaining component carriers may be defined as secondary cells ("SCells").

Depending on the desired implementation, an eNodeB may be carrier aggregation capable or not. If an eNodeB is carrier aggregation capable, the eNodeB may have certain policies on which of its carriers, per sector, can be combined together to provide carrier aggregation. By way of example, an eNodeB may have a carrier-aggregation policy that indicates which carrier(s) can be used as a PCell in combination with which one or more carriers being SCell(s). For instance, in one scenario, a carrier-aggregation policy may indicate that a first carrier and a second carrier may be used as PCells, but a third carrier may not be used as a PCell. Further, the carrier-aggregation policy may indicate that (i) the first carrier can be a PCell with the second carrier as an SCell, but not with the third carrier as an SCell, but (ii) the second carrier can be a PCell with both the first carrier and the third carrier as SCells. Thus, if the first carrier is used as a PCell, the eNodeB may aggregate two carriers, but if the second carrier is used as a PCell, the eNodeB may aggregate three carriers.

In practice, an eNodeB may implement a carrier-aggregation policy for a number of reasons. As one example, certain pairs of carriers may be undesirable to combine because concurrent transmission on the two carriers could give rise to intermodulation distortion. For instance, concurrent transmission on two particular carriers may combine to produce an undesirable radio frequency (RF) byproduct. If an eNodeB engages in carrier aggregation with a UE on the two carriers, the UE or eNodeB may receive the RF byproduct, thus interfering with the transmissions on the two carriers. As another example, an eNodeB may implement a carrier-aggregation policy that is dynamically modified over time based on the level of congestion in the control channel region of a particular cell. For instance, if all control signaling is configured to occur on PCells rather than SCells, and a control channel region of the particular cell is threshold highly congested, then it may be desirable to avoid using that cell as a PCell, but allow the cell to be used as an SCell.

OVERVIEW

In a system as described above, a base station may use information regarding a neighboring base station's cell IDs and corresponding PCIs as a basis to manage handover. For instance, the base station may use the information to decide whether to grant a handover when a UE reports having detected coverage from one of those PCIs.

In such a system, it may also be useful for a base station to use a neighboring base station's carrier-aggregation policies as a basis to manage handover. More specifically, when a base station receives a report from a UE of sufficient detected coverage of a particular cell of a neighboring base station, it may be advantageous for the base station to make a decision of whether or not to invoke handover of the UE to the particular cell depending on the extent to which the neighboring base station's carrier-aggregation policy allows the particular cell to be used in carrier aggregation.

As one example, it may be advantageous for the base station to make a decision of whether or not to invoke handover of the UE to the particular cell depending on whether or not the neighboring base station would be able to support carrier aggregation with the UE on the particular cell. For instance, if the neighboring base station would be able to support carrier aggregation on the particular cell, it may acceptable for the base station to hand over the UE to the particular cell, such that the UE can engage in carrier aggregation with the neighboring base station on the particular cell. However, if the neighboring station would not be able to support carrier aggregation on the particular cell but would be able to support carrier aggregation on another cell that is provided by the neighboring base station and is co-located with the particular cell, it may be advantageous for the base station to invoke handover of the UE to the other cell of the multiple co-located cells rather than invoking handover of the UE to the particular cell, such that the UE can engage in carrier aggregation with the neighboring base station on the other cell.

Furthermore, it may be advantageous for the base station to make a decision of whether or not to invoke handover of the UE to the particular cell depending on the extent to which the neighboring base station's carrier-aggregation policy allows one or more other co-located cells to be used as SCells together with the particular cell being used as a PCell. For instance, in one scenario, the neighboring base station's carrier-aggregation policy may specify that (i) the particular cell may be a PCell and carrier-aggregated with another carrier acting as an SCell, but (ii) another cell that is co-located with the particular cell may be a PCell with two other carriers both acting as SCells. In this scenario, it may be desirable for the base station to invoke handover of the UE to the other cell rather than the particular cell, since the neighboring base station may then be able to serve the UE by aggregating three carriers as opposed to serving the UE by aggregating only two carriers.

Likewise, it may be advantageous for the base station to consider the size of each cell that the neighboring base station's carrier-aggregation policy allows to be carrier-aggregated. For instance, in another scenario, a neighboring base station may provide three co-located cells: cell A, cell B, and cell C. Cells A and B may each be 10 MHz, and cell C may be 20 MHz. Further, the carrier-aggregation policy may specify that cell A may be a PCell carrier-aggregated with cell B as an SCell, and that cell B may be a PCell carrier-aggregated with cell C as an SCell. In other words, by carrier aggregating cells A and B, the neighboring base station may serve a UE with a combined bandwidth of 20 MHz, and by carrier aggregating cells B and C, the neighboring base station may serve a UE with a combined bandwidth of 30 MHz. In this scenario, if the base station receives a report from a UE of sufficient detected coverage of cell A, it may therefore be advantageous for the base station to instead invoke handover of the UE to cell B, so that the neighboring base station can serve the UE with the greater combined bandwidth of 30 MHz.

Additionally, it may be useful for UEs to consider the carrier-aggregation policies of neighboring base stations when operating in idle mode as a basis to facilitate cell reselection. In the idle mode, a UE may not currently be assigned particular traffic channel resources, but the UE may monitor a downlink control channel to detect page messages and other information regarding incoming transactions. As part of a cell reselection process, the UE may also monitor signals provided in one or more cells of neighboring base stations to evaluate whether or not a better cell exists (e.g., a cell having a better quality level or received signal strength). When a UE detects sufficient coverage of a particular cell of a neighboring base station, it may be advantageous for the UE to make a decision of whether or not to attach to the particular cell via reselection depending on the extent to which the neighboring base station's carrier-aggregation policy allows the particular cell to be used in carrier aggregation. For instance, if the neighboring base station would not be able to support carrier aggregation on the particular cell but would be able to support carrier aggregation on another cell provided by the neighboring base station that is co-located with the particular cell, it may be advantageous for the UE to attach to the other cell of the multiple co-located cells rather than attaching to the particular cell, such that the UE can engage in carrier aggregation with the neighboring base station on the other cell.

Furthermore, it may also be advantageous for the UE to consider the extent to which the neighboring base station's carrier-aggregation policy allows one or more other co-located cells to be used as SCells together with the particular cell being used as a PCell. For example, it may be advantageous for the UE to consider how many other cells co-located with the particular cell can be SCells used in combination with the particular cell, and determine whether or not there is another co-located cell that could also be used as a PCell and carrier-aggregated with a greater number of SCells. Similarly, it may be advantageous for the UE to consider the size of each cell with which the neighboring base station's carrier-aggregation policy allows the particular cell to be carrier-aggregated, and determine whether or not there is another co-located cell that could be used as a PCell and carrier-aggregated with a larger SCell(s). In this manner, when a UE detects sufficient coverage of a particular cell, the UE could decide to engage in a cell reselection process to attach to a different cell that is co-located with the particular cell if the other cell would support more carrier-aggregation capability than the particular cell (e.g., allow the neighboring base station to carrier-aggregate a greater number of cells or allow the neighboring base station to serve the UE with a greater combined bandwidth).

Unfortunately, base stations are unaware of the carrier-aggregation policies of their neighboring base stations and are currently not configured to manage handover on the basis of such carrier-aggregation policies. Likewise, UEs are also unaware of the carrier-aggregation policies of neighboring base stations and are currently not configured to manage cell reselection on the basis of such carrier-aggregation policies. In some examples, this may result in inefficient results.

For instance, a UE may receive a first signal of a first cell provided by a neighboring base station with a first signal strength and receive a second signal of a second cell provided by the neighboring base station with a relatively weaker signal strength. Unbeknownst to the UE, the neighboring base station may not support carrier aggregation on the first cell, but the neighboring base station may support carrier aggregation on the second cell. In such a scenario, the UE may be able to receive comparatively better service (e.g., greater bandwidth with relatively weaker signal) if the neighboring base station serves the UE on the second cell. However, based on signal strength alone, the UE may report to a base station that is currently serving the UE that the UE has detected the first cell of the neighboring base station. Consequently, the base station that is currently serving the UE may decide to grant handover of the UE to the first cell rather than the second cell, resulting in suboptimal service for the UE.

Disclosed herein are methods and corresponding systems to help address these problems. In accordance with the disclosure, a first base station that is serving a UE, and/or the UE that is being served by the first base station, may use a second base station's carrier-aggregation policy for at least one of multiple co-located cells provided by the second base station as a basis to control handover of the UE from being served by the first base station to being served by the second base station.

By way of example, the first base station may receive from the second base station the respective carrier-aggregation policy for each of multiple co-located cells that are provided by the second base station. For instance, the second base station may provide multiple co-located cells each operating on a respective carrier. Additionally, the carrier-aggregation policies may specify, for each cell of the multiple co-located cells, whether the cell is configured to be a PCell carrier-aggregated with another one of the multiple co-located cells provided by the second base station.

Further, in one example scenario, the first base station may receive from the UE a report that the UE has detected a particular one of the multiple co-located cells provided by the second base station. And responsive to the report being that the UE has detected the particular cell, the first base station may use the second base station's carrier-aggregation policy for the particular cell as a basis to control handover of the UE.

As an example, the carrier-aggregation policy for the particular cell may indicate whether or not the cell is configured to be a PCell. In other words, the carrier-aggregation policy may indicate whether or not the second base station is configured to use another cell of the multiple co-located cells provided by the second base station as an SCell together with the particular cell as a PCell. If the particular cell is configured to be a PCell, then, based at least in part on the particular cell being configured to be a PCell, the first base station may invoke handover of the UE to the particular cell. But if the particular cell is not configured to be a PCell, then, based at least in part on the particular cell not being configured to be a PCell, the base station may instead invoke handover of the UE to a different cell of the multiple co-located cells that is configured to be a PCell.

In another example, the first base station may also use the second base station's carrier-aggregation policy for one or more other cells, in addition to the carrier-aggregation policy for the particular cell, as a basis to control handover of the UE. For instance, as discussed above, for each of the multiple co-located cells provided by the second base station, the second base station's respective carrier-aggregation policy may indicate whether the cell is configured to be a PCell. Further, for each cell that is configured to be a PCell, the second base station's respective carrier-aggregation policy may further indicate an extent to which the cell is configured to be carrier-aggregated with one or more other cells of the multiple co-located cells provided by the second base station. As an example, for a given cell, the extent to which the cell is configured to be carrier-aggregated may include an indication of a number of cells of the multiple co-located cells (e.g., one cell, two cells, three cells, etc.) that are configured to be SCells carrier-aggregated with the cell. As another example, for a given cell, the extent to which the cell is configured to be carrier-aggregated may include a maximum carrier-aggregation bandwidth that the second base station is configured to provide with the cell being configured as a PCell.

Further, if the particular cell detected by the UE is configured to be a PCell, the first base station may use (i) an extent to which the particular cell is configured to be carrier-aggregated with one or more other cells and (ii) an extent to which another one of the multiple co-located cells is configured to be carrier-aggregated with one or more other cells as a basis to control handover of the UE. For instance, if another cell of the multiple co-located cells would support more carrier-aggregation capability than the particular cell, then the first base station may instead invoke handover of the UE to the other cell.

Additionally or alternatively, in another example scenario, the first base station may provide the second base station's carrier-aggregation policies to the UE. For instance, the first base station may broadcast to the UE over an RF interface provided by the first base station the second base station's carrier-aggregation policy for each cell of the multiple co-located cells. This may allow the UE to use the second base station's carrier-aggregation policy for one or more of the multiple co-located cells as the basis to control cell reselection. In this manner, responsive to detecting a particular one of the multiple co-located cells provided by the second base station, the UE can intelligently decide whether to reselect the particular cell based on the carrier-aggregation policy for the particular cell and optionally the carrier-aggregation policy for one or more other cells of the multiple co-located cells.

Accordingly, disclosed herein is a method that may be operable in a radio access network (RAN) including a first base station and a second base station. The second base station may provide multiple co-located cells each operating on a respective carrier and, for each cell of the multiple co-located cells, impose a respective carrier-aggregation policy regarding carrier-aggregating of the cell respectively with each other cell of the multiple co-located cells. The method may involve serving by the first base station a UE. And the method may involve using by the first base station the second base station's carrier-aggregation policy for at least one cell of the multiple co-located cells as a basis to control handover of the UE from being served by the first base station to being served by the second base station.

In another respect, disclosed is a base station that may include an antenna structure for wirelessly communicating with UEs, a network communication interface through which the base station is configured to receive carrier-aggregation policies from another base station, and a controller. The other base station may provide multiple co-located cells each operating on a respective carrier. Also, the received carrier-aggregation policies may define, for each cell of the multiple co-located cells, a respective carrier-aggregation policy regarding carrier-aggregating of the cell respectively with each other cell of the multiple co-located cells. Further, the controller may be arranged to use the other base station's carrier-aggregation policy for at least one cell of the multiple co-located cells as a basis to control handover of a UE from being served by the base station to being served by the other base station.

Still further, in another respect, disclosed is method that may be implemented by a UE in a wireless communication system. The wireless communication system may include a first base station and a second base station. Further, the second base station may provide multiple co-located cells each operating on a respective carrier and, for each cell of the multiple co-located cells, impose a respective carrier-aggregation policy regarding carrier-aggregating of the cell respectively with each other cell of the multiple co-located cells. The method may involve receiving by the UE, from the first base station, the second base station's carrier-aggregation policy for each cell of the multiple co-located cells provided by the second base station. Additionally, the method may involve detecting by the UE a particular one of the multiple co-located cells provided by the second base station. And the method may involve, responsive to the detecting the particular cell of the multiple co-located cells provided by the second base station, using by the UE the second base station's carrier-aggregation policy for the particular cell as a basis to control cell reselection.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 4 is an illustration of example carrier-aggregation policies.

DETAILED DESCRIPTION

Figure 1:
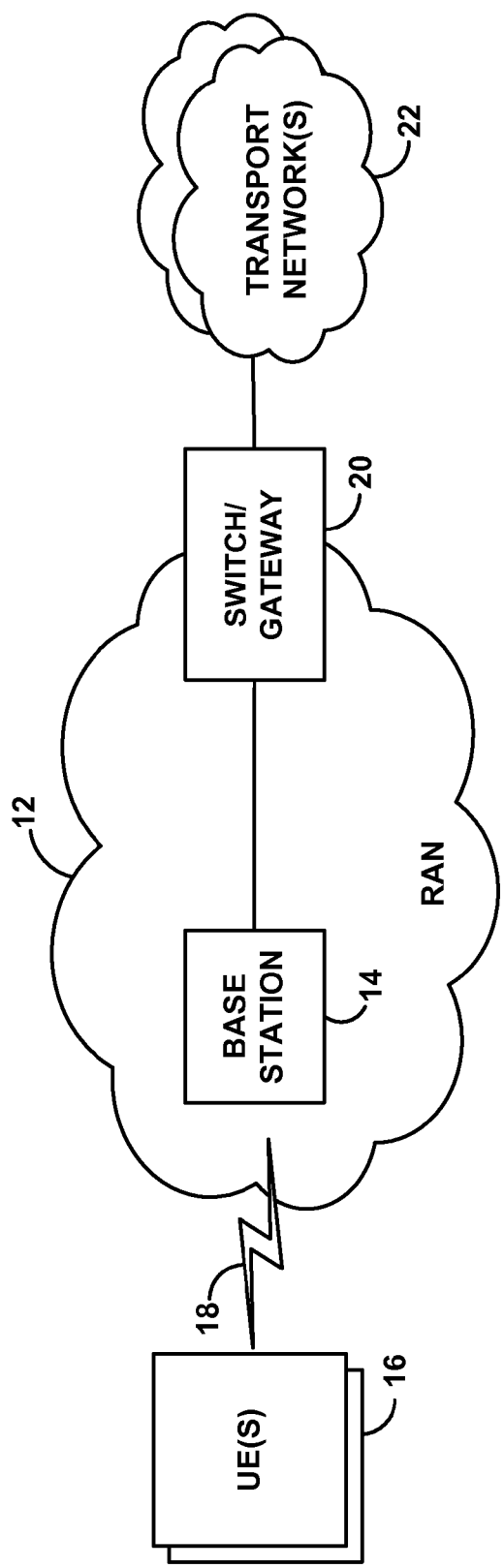
FIG. 1 is a simplified block diagram of an example wireless communication system in which the present disclosure can be implemented.

Referring to the drawings, as noted above, FIG. 1 is a simplified block diagram of an example wireless communication system in which the present disclosure can be implemented. It should be understood, however, that this and other arrangements described herein are set forth only as examples. As such, those skilled in the art will appreciate that other arrangements and elements (e.g., machines, interfaces, functions, orders, and grouping of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software.

FIG. 1 depicts the example communication system as including at its core a RAN 12 having a representative base station 14, base station 14 being arranged to serve UE(s) 16 in a coverage area through an air interface 18. The base station may be a macro base station that is positioned at a fixed location and providing fairly wide coverage from that location. Alternatively, the base station may be a small cell base station that is currently located at a particular location and may provide more restricted coverage from that location.

RAN 12 further includes by way of example a switch or gateway 20 that provides connectivity with one or more transport networks 22, such as the PSTN or the Internet for instance. With this arrangement, each UE that is in coverage of the base station and that is suitably equipped may register or attach with the RAN and may engage in air interface communication with the base station so as to communicate in turn with various remote entities on the transport network(s) and/or with the other UEs served by the RAN. Numerous variations from this arrangement are possible, however. For instance, the RAN may include more than one switch or gateway and may include various components between each switch or gateway and the transport network(s).

In this arrangement, the air interface 18 may be configured according to a particular air interface protocol, and the UE and base station may be programmed or otherwise configured to operate according to that protocol. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. According to the air interface protocol, air interface 18 may thus define a plurality of resource blocks for carrying communications between the UEs and the base station.

Figure 2:
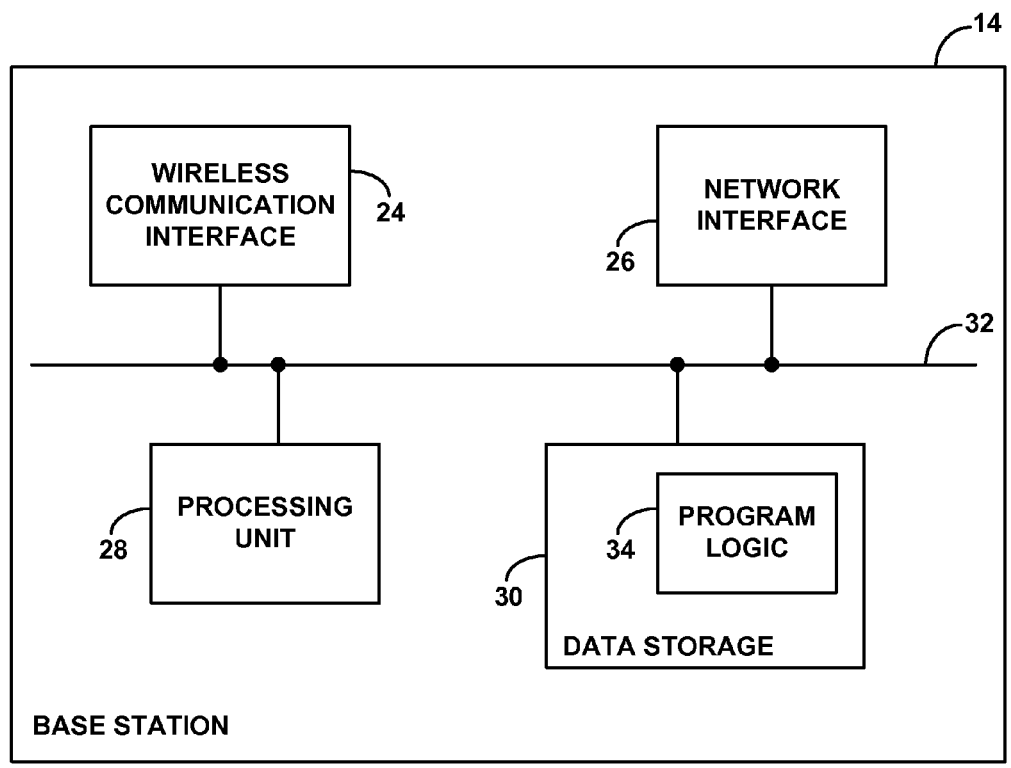
FIG. 2 is a block diagram of an example base station, in accordance with exemplary embodiments.

FIG. 2 is next a simplified block diagram of a representative base station 14, such as a base transceiver station, access node, access point, Node-B, or eNodeB, for instance (whether macro, femto or the like), illustrating some of the components that can be included in such an entity. As shown in FIG. 2, the representative base station 14 includes a wireless communication interface 24, a network interface 26, a processing unit 28, and data storage 30, all of which may be coupled together by a system bus, network or other connection mechanism 32.

Wireless communication interface 24 may function to engage in air interface communication with served devices, such as UEs 16. As such, wireless communication interface 24 may comprise an antenna arrangement (not shown), which may be tower mounted, and associated components such as a power amplifier and a cell site modem (not shown), so as to transmit and receive bearer and control data.

Network interface 26 may then comprise a wired or wireless interface for communicating with one or more other base stations. By way of example, the network interface 26 may be an interface through which the base station 14 is configured to receive information regarding cells provided by a neighboring base station. For instance, the neighboring base station may send to the base station 14 an indication of (i) the neighboring base station's ECGI and (ii) the cell ID and corresponding PCI of each cell provided by the neighboring base station. The base station 14 may store the information in the data storage 30. Thus, the base station 14 may have a record of the neighboring base station's ECGI and a mapping between the PCI and cell ID of each cell provided by the neighboring base station.

Furthermore, the base station 14 may be configured to receive carrier-aggregation policies from the neighboring station. For instance, the neighboring base station may send to the base station 14, for each cell provided by the neighboring base station, a respective carrier-aggregation policy for the cell. Additionally, the base station 14 may be configured to receive load information from the neighboring base station. For instance, the neighboring base station may send to the base station 14, for each cell provided by the neighboring base station, respective load information regarding load on the cell. In one example configuration, the neighboring base station may send the load information on a periodic basis (e.g., every few seconds, every minute, etc.) In another configuration, the neighboring base station may send the load information whenever one or more cells provided by the neighboring base station are threshold highly congested. In some instances, rather than providing load information for each cell, the neighboring base station may only provide load information for cells that have a respective load which is higher than a load threshold.

In an LTE system, for instance, the network interface 26 may be an X2 interface. In this scenario, the neighboring base station may communicate information to the base station 14 by sending messages carrying information elements over the X2 interface. For example, a neighboring base station may communicate carrier-aggregation policies to the base station 14 when an X2 interface is provisioned between the neighboring base station and the base station 14 (e.g., upon manual neighbor relation establishment or through an automated neighbor relation process). Alternatively or additionally, the neighboring base station may communicate the carrier-aggregation policies to the base station 14 whenever the base station 14 modifies the carrier-aggregation policies. Other examples are also contemplated. Thus, the examples are not meant to be limiting. Further, in some examples, the network interface 26 may comprise a wired or wireless interface for communicating with the switch/gateway 20.

Processing unit 28 may then comprise one or more general purpose processors (e.g., microprocessors) and/or one or more special-purpose processors (e.g., digital signal processors and/or application specific integrated circuits) and may be integrated in whole or in part with the wireless communication interface 24. And data storage 30 may comprise one or more volatile and/or non-volatile storage components, such as magnetic, optical, flash, or other types of non-transitory computer readable media, and may be integrated in whole or in part with processing unit 28.

As shown, data storage 30 may store program logic 34 (e.g., machine language instructions), which may be executable by processing unit 28 to carry out various base station functions described herein. For instance, program logic 30 may be executable to cause the base station to use another base station's carrier-aggregation policy for at least one of multiple co-located cells provided by the other base station as a basis to control handover of a UE from being served by the base station 14 to being served by the other base station.

In accordance with the present disclosure, as discussed above, base station 14 may serve one or more UEs 16 via an interface. In one example, one of the UEs 16 may report to the base station 14 that the UE has detected a particular cell provided by a neighboring base station. For instance, the UE may send a report to the base station 14 indicating a PCI of the particular cell. The particular cell may be one of multiple co-located cells provided by the neighboring base station. By way of example, FIG. 3 is an illustration of an example wireless communication system in which this may occur.

Figure 3:
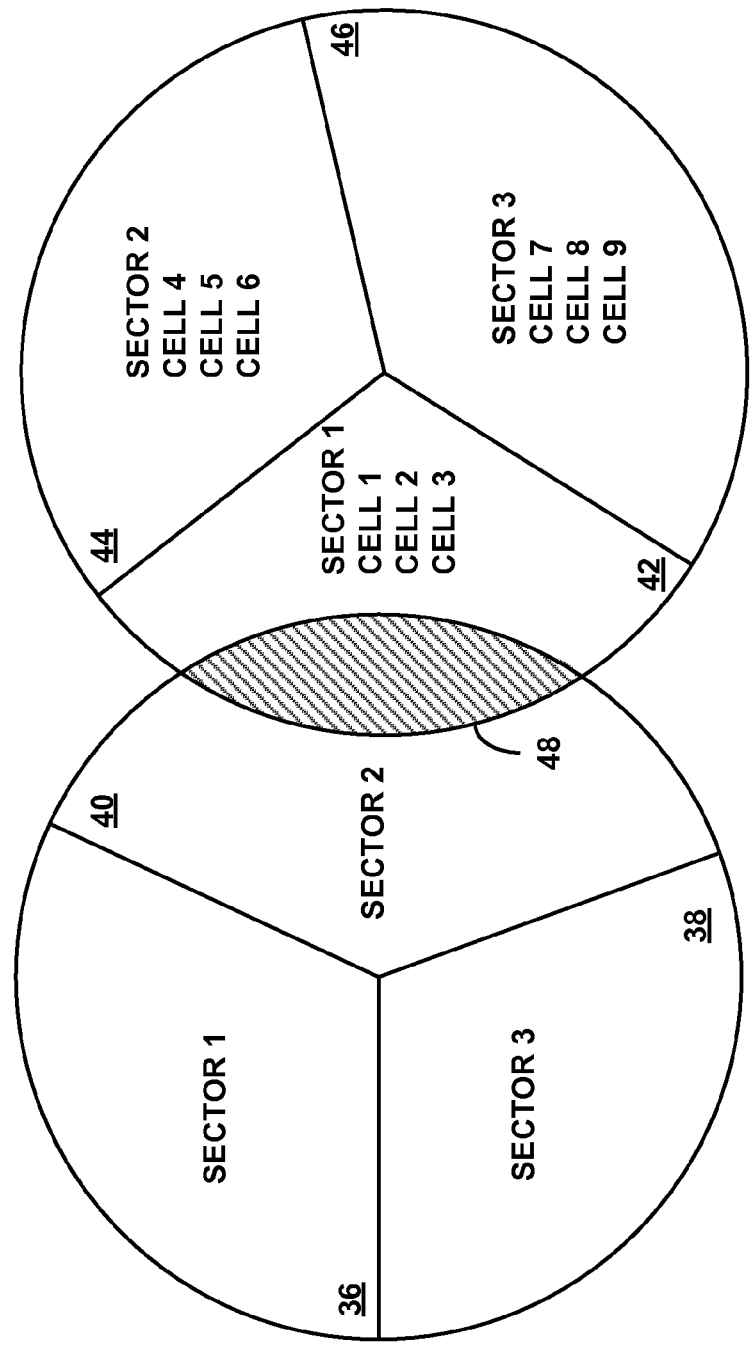
FIG. 3 is an illustration of an example wireless communication system.

FIG. 3 depicts the example wireless communication system as including multiple sectors 36, 38, 40 provided by base station 14 as well as multiple sectors 42, 44, 46 provided by a neighboring base station. In one example, the neighboring base station may provide multiple co-located cells within each of sectors 42, 44, 46. More specifically, within a first sector 42, the neighboring base station may provide three cells having respective cell IDs of 1, 2, and 3; within a second sector 44, the neighboring base station may provide three cells having respective cell IDs of 4, 5, and 6; and within a third sector 46, the neighboring base station may provide three cells having respective cell IDs of 7, 8, and 9. In some examples, base station 14 may also provide multiple co-located cells within one or more of sectors 36, 38, and 40 (not shown).

Note that the co-located cells at issue need not be coterminous. Rather, as used herein, two or more cells provided by a base station may be considered co-located if a UE can detect coverage of each of the two or more cells at one or more physical locations throughout a coverage area of the base station.

In one example, if a UE is being served by the base station 14 on a cell in sector 40 and is located within an area 48 in which sector 40 overlaps with the first sector 42 provided by the neighboring base station, the UE may detect sufficient coverage of a particular cell of the neighboring base station (e.g., cell 1, cell 2, or cell 3). Further, the UE may then provide to the base station 14 a report that the UE has detected the particular cell that includes the PCI of the detected cell.

In line with the discussion above, the base station 14 may have a record of the mapping between PCI and corresponding cell IDs for the cells provided by the neighboring base station. Further, the base station 14 may have received the carrier-aggregation policies for each cell of the neighboring base station from the neighboring base station. Thus, the base station 14 may be able to identify the cell ID of the detected cell based on the PCI reported by the UE. Using the cell ID, the base station may then identify the carrier-aggregation policy imposed by the neighboring base station for the detected cell.

In practice, the carrier-aggregation policies implemented by the neighboring base station may take a number of forms. FIG. 4 is an illustration of carrier-aggregation policies 50 that the neighboring base station may implement by way of example. In particular, the figure depicts three example carrier-aggregation policies that the neighboring base station implements for cell 1, cell 2, and cell 3 respectively of the first sector 42.

As shown in FIG. 4, the example carrier-aggregation policy for cell 1 indicates that cell 1 may be configured as a PCell together with cell 2 as an SCell, providing a maximum carrier-aggregation bandwidth of 20 MHz. Further, the example carrier-aggregation policy for cell 2 indicates that cell 2 may be configured as a PCell together with cells 1 and/or 3 as an SCell(s), providing a maximum carrier-aggregation bandwidth 40 Mhz. And the example carrier-aggregation policy for cell 3 indicates that cell 3 may be configured as a PCell together with cell 1 as an SCell, providing a maximum carrier-aggregation bandwidth of 30 MHz.

The three example carrier-aggregation policies are provided for purposes of example. In other arrangements, a carrier-aggregation policy may include more or less information. For instance, in another arrangement, a carrier-aggregation policy may not indicate the maximum carrier-aggregation bandwidth.

Continuing with the example above, if the UE reports to the base station 14 that the UE has detected coverage of cell 1, for example, the base station 14 may use the carrier-aggregation policy for cell 1 as a basis to control handover of the UE from being served by the base station 14 to being served by the neighboring base station.

As one example, the base station 14 may be configured to control the handover of the UE in a manner depending at least in part on whether cell 1 is configured to be a PCell or rather an SCell. As indicated in the example carrier-aggregation policy for cell 1 of FIG. 4, cell 1 is configured to be a PCell. Consequently, based on cell 1 being configured to be a PCell, the base station 14 may invoke handover of the UE to cell 1 of the neighboring base station. On the other hand, in an instance in which cell 1 is not configured to be a PCell (not shown), then, based on cell 1 not being configured to be a PCell, the base station 14 may instead invoke handover of the UE to a different cell of the neighboring base station that is co-located with cell 1 and configured to be a PCell (e.g., cell 2 or cell 3).

As another example, the base station 14 may be configured to control the handover of the UE in a manner depending at least in part on an extent to which the neighboring base station's carrier-aggregation policy for cell 1 permits cell 1 to be carrier-aggregated with one or more other co-located cells provided by the neighboring base station. For instance, if the neighboring base station's carrier aggregation policies permit cell 1 to be configured as a PCell and also permit one or more other cells co-located with cell 1 to be configured as PCells, as is the case in the example depicted in FIG. 4, the base station 14 may control handover of the UE depending on the extent to which cell 1, and any other cells co-located with cell 1 that may also be configured as PCells, may be carrier-aggregated with one or more other cells provided by the neighboring base station.

In one instance, for each of cell 1 and any other cells that may be configured as PCells, the base station 14 may consider the number of SCells that may be configured with the cell. As a particular example, the carrier-aggregation policies of FIG. 4 indicate that, in addition to cell 1, cells 2 and 3 may also be configured as PCells. Consequently, the base station 14 may consider the number of SCells that may be carrier-aggregated with each of cell 1, cell 2, and cell 3 respectively when cell 1, cell 2, and cell 3 are configured as a PCell. Since FIG. 4 indicates that cell 2 may be carrier-aggregated with two different SCells but cell 1 may only be carrier-aggregated with a single SCell, the base station may decide to invoke handover of the UE to cell 2 rather than cell 1. In this manner, the base station may maximize the number of carriers that the neighboring base station may aggregate to serve the UE.

In another instance, the base station 14 may consider the maximum carrier-aggregation bandwidth that the neighboring base station may provide when cell 1, cell 2, and cell 3 respectively are configured as a PCell. For example, the carrier-aggregation policies depicted in FIG. 4 indicate that from among cells 1, 2, and 3, the neighboring base station may provide the maximum carrier-aggregation bandwidth (i.e., 40 MHz) when cell 2 is configured as the PCell. Consequently, based on the maximum carrier-aggregation bandwidth when cell 2 is configured as the PCell being greater than the maximum carrier-aggregation bandwidth when cell 1 is configured as a PCell, the base station 14 may invoke handover of the UE to cell 2 instead of handing over the UE to cell 1. In this manner, the base station may maximize the carrier-aggregation bandwidth with which the neighboring base station serves the UE.

Optionally, in some examples, the base station 14 may use load information for cell 1, and perhaps one or more other cells provided by the neighboring base station, as a further basis to control handover of the UE from being served by the base station 14 to being served by the neighboring base station. In one instance, if a respective load for cell 1 is currently greater than a load threshold, the base station 14 may determine whether the neighboring base station may be able to serve the UE on any other cells co-located with cell 1 instead of serving the UE on cell 1. For example, if cell 2 and cell 3 are co-located with cell 1, the base station may decide to invoke handover of the UE to cell 2 or cell 3 instead of cell 1. Further, when considering whether to invoke handover to cell 2 or cell 3, the base station may, for instance, choose the cell having the lower amount of load.

Further in line with the discussion above, in some instances, the base station 14 may broadcast the neighboring base station's carrier-aggregation policy for each cell provided by the neighboring base station to the UE that is being served by the base station. By way of example, the base station 14 may broadcast the neighboring base station's carrier-aggregation policy for each cell provided by the neighboring base station to the UE in a system information block (SIB) message. The UE may then receive the neighboring base station's carrier-aggregation policy for each cell, and store the information in a memory of the UE. Upon detecting a particular cell of the neighboring base station, the UE may then use the neighboring base station's carrier aggregation policy for the particular cell as a basis to control cell reselection.

In one instance, the carrier-aggregation policies broadcast by the base station 14 may use the PCI of the neighboring base station's cells when referring to cells of the neighboring base station, since the UE may be able to detect the PCI of a cell of the neighboring base station, but may be unaware of the cell ID. Thus, if the carrier-aggregation policies received by the base station 14 from the neighboring base station have references to cell IDs, the base station 14 may replace the references to cell IDs with the corresponding PCI prior to broadcasting the carrier-aggregation policies to the UE.

In another instance, the carrier-aggregation policies broadcast by the base station 14 may use the cell ID of the neighboring base station's cells when reference to cells of the neighboring base station. In this scenario, the base station 14 may also broadcast the neighboring base station's mapping between PCIs and corresponding Cell IDs to the UE. The UE can then identify a carrier-aggregation policy corresponding to a particular PCI using the neighboring base station's mapping information. Specifically, the UE may identify a cell ID corresponding to a PCI of a detected cell using the mapping information, and then identify a carrier-aggregation policy for the detected cell based on the identified cell ID.

As discussed above, responsive to detecting a cell of the neighboring base station, the UE may use the carrier-aggregation policy for the detected cell as a basis to control cell reselection. For instance, responsive to detecting cell 1 of FIG. 4, the UE may use the neighboring base station's carrier aggregation for cell 1, and perhaps one or more other co-located cells (e.g., cells 2 and 3), as a basis to control cell reselection.

As one example, when operating in the idle mode, the UE may be configured to perform cell reselection in a manner depending at least in part on whether cell 1 is configured to be a PCell or rather an SCell. As indicated in the example carrier-aggregation policy for cell 1 of FIG. 4, cell 1 is configured to be a PCell. Consequently, based on cell 1 being configured to be a PCell, the UE may reselect cell 1 of the neighboring base station. In practice, the UE may reselect cell 1 by reporting to base station 14 that the UE has detected sufficient coverage of cell 1 and transitioned to idling on cell 1, for example. On the other hand, in an instance in which cell 1 is not configured to be a PCell (not shown), then, based on cell 1 not being configured to be a PCell, the UE may instead reselect a different cell of the neighboring base station that is co-located with cell 1 and configured to be a PCell (e.g., cell 2 or cell 3). To reselect the different cell, the UE may, for example, report to the base station 14 that the UE has transitioned to idling on the different cell. Alternatively, in some instances, the UE may attach to the neighboring base station without reporting to the base station 14 that the UE has reselected a cell of the neighboring base station.

As another example, the UE may be configured to perform cell reselection in a manner depending at least in part on an extent to which the neighboring base station's carrier-aggregation policy for cell 1 permits cell 1 to be carrier-aggregated with one or more other co-located cells provided by the neighboring base station. For instance, if the neighboring base station's carrier aggregation policies permit cell 1 to be configured as a PCell and also permit one or more other cells co-located with cell 1 to be configured as PCells, as is the case in the example depicted in FIG. 4, the UE may perform cell reselection depending on the extent to which cell 1, and any other cells co-located with cell 1 that may also be configured as PCells, may be carrier-aggregated with one or more other cells provided by the neighboring base station.

In one instance, for each of cell 1 and any other cells that may be configured as PCells, the UE may consider the number of SCells that may be configured with the cell. As a particular example, the carrier-aggregation policies of FIG. 4 indicate that, in addition to cell 1, cells 2 and 3 may also be configured as PCells. Consequently, the UE may consider the number of SCells that may be carrier-aggregated with each of cell 1, cell 2, and cell 3 respectively when cell 1, cell 2, and cell 3 are configured as a PCell. Since FIG. 4 indicates that cell 2 may be carrier-aggregated with two different SCells but cell 1 may only be carrier-aggregated with a single SCell, the UE may decide to reselect cell 2 rather than cell 1. In this manner, the UE may maximize the number of carriers that the neighboring base station may aggregate to serve the UE.

In another instance, the UE may consider the maximum carrier-aggregation bandwidth that the neighboring base station may provide when cell 1, cell 2, and cell 3 respectively are configured as a PCell. For example, the carrier-aggregation policies depicted in FIG. 4 indicate that, from among cells 1, 2, and 3, the neighboring base station may provide the maximum carrier-aggregation bandwidth (i.e., 40 MHz) when cell 2 is configured as the PCell. Consequently, based on the maximum carrier-aggregation bandwidth when cell 2 is configured as the PCell being greater than the maximum carrier-aggregation bandwidth when cell 1 is configured as a PCell, the UE may reselect cell 2 instead of cell 1. In this manner, the UE may maximize the carrier-aggregation bandwidth with which the neighboring base station serves the UE.

Figure 5:
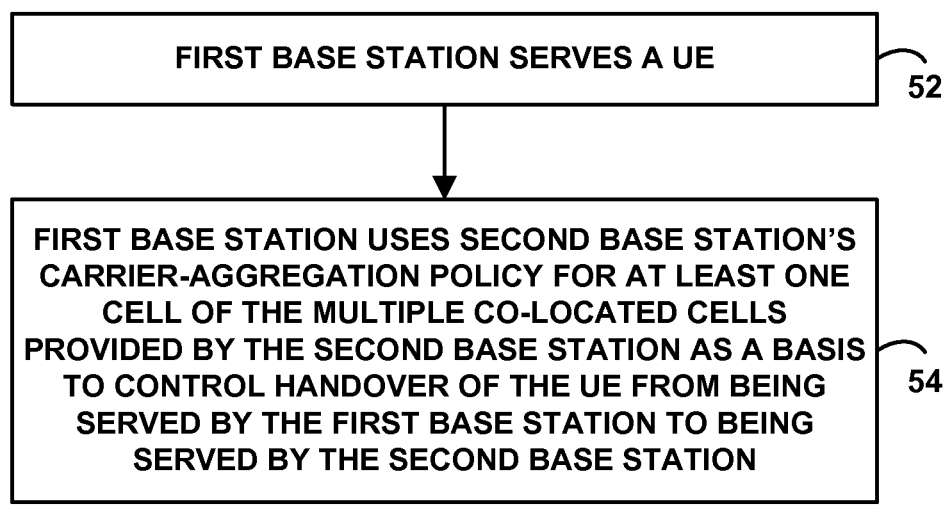
FIG. 5 is a flow chart depicting functions that can be carried out in accordance with the present disclosure.

FIG. 5 is next flow chart depicting functions that can be carried out by a base station (e.g., an eNodeB or other type of base station) in accordance with the present disclosure. In line with the discussion above, the base station may be a first base station in a radio access network that includes the first base station and a second base station. Further, the second base station may provide multiple co-located cells each operating on a respective carrier. Also, for each cell of the multiple co-located cells, the second base station may impose a respective carrier-aggregation policy regarding carrier-aggregating of the cell respectively with each other cell of the multiple co-located cells.

As shown in FIG. 5, at block 52, the first base station may serve a UE. And at block 54, the first base station may use the second base station's carrier-aggregation policy for at least one cell of the multiple co-located cells provided by the second base station as a basis to control handover of the UE from being served by the first base station to being served by the second base station.

As discussed above, the first base station may receive from the second base station the second base station's respective carrier-aggregation policy for each cell of the multiple co-located cells to facilitate the first base station's use of the carrier-aggregation policy for at least one cell. For example, the first base station may receive the carrier-aggregation policies from the second base station over an X2 interface between the first base station and the second base station.

Further in line with the discussion above, the first base station may also receive from the UE, a report that the UE has detected a particular one of the multiple co-located cells provided by the second base station. And responsive to the report being that the UE has detected the particular cell, the UE may use the second base station's carrier-aggregation policy for the particular cell as the basis to control handover of the UE.

As noted above, in some examples, for each cell of the multiple co-located cells, the respective carrier-aggregation policy may specify whether the cell is configured to be a PCell carrier-aggregated with another one of the multiple co-located cells. In this situation, the first base station may be arranged to control handover of the UE to the particular cell in a manner depending on whether the particular cell is configured to be a PCell or rather an SCell.

Additionally, in some examples, for each cell of the multiple co-located cells that is configured to be a PCell, the respective carrier-aggregation policy may further specify an extent to which the cell is configured to be carrier-aggregated with one or more other cells of the multiple co-located cells. In this situation, the first base station may be arranged to control handover of the UE to the particular cell in a manner depending on the extent to which the particular cell is configured to be carrier-aggregated with one or more other cells of the multiple co-located cells.

Figure 6:
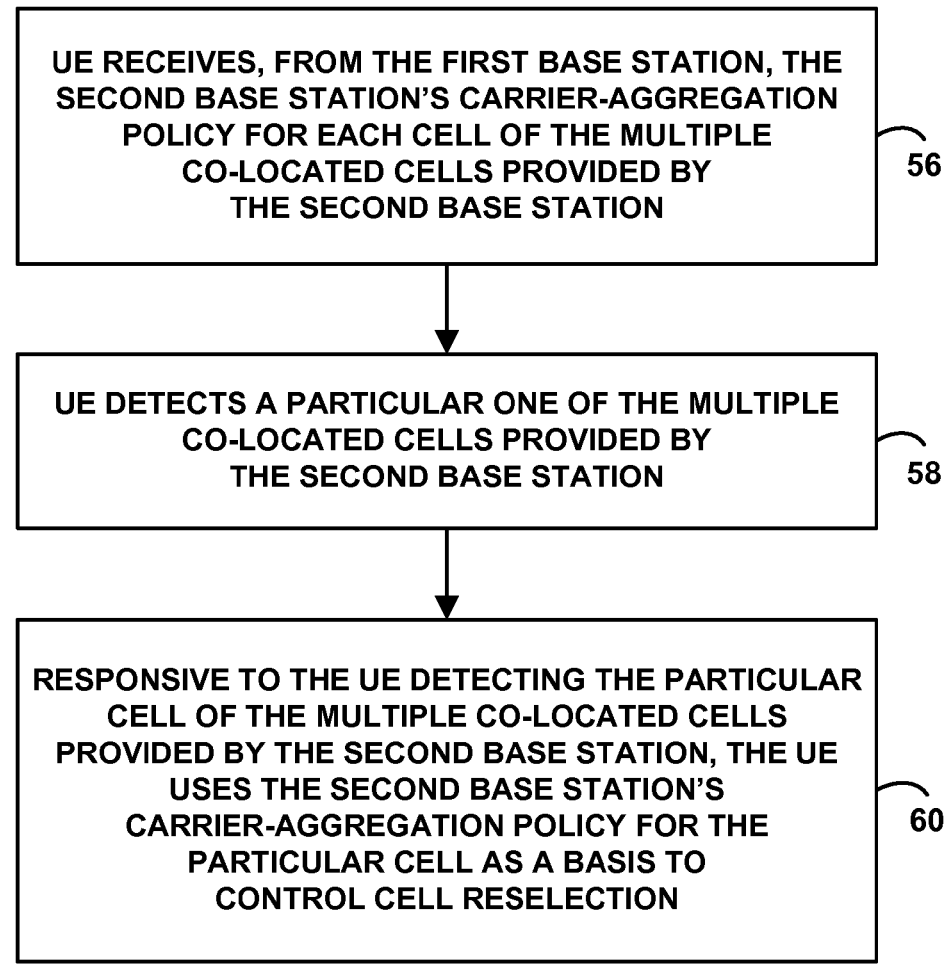
FIG. 6 is another flow chart depicting functions that can be carried out in accordance with the present disclosure.

FIG. 6 is another flow chart depicting functions that can be carried out by a UE in accordance with the present disclosure. In line with the discussion above, the functions may be carried out in a wireless communication system having a first base station and a second base station. Further, the second base station may provide multiple co-located cells each operating on a respective carrier. Also, for each cell of the multiple co-located cells, the second base station may impose a respective carrier-aggregation policy regarding carrier-aggregating of the cell respectively with each other cell of the multiple co-located cells.

As shown in FIG. 6, at block 56, the UE receives, from the first base station, the second base station's carrier-aggregation policy for each cell of the multiple co-located cells provided by the second base station. At block 58, the UE detects a particular one of the multiple co-located cells provided by the second base station. And at block 60, responsive to the UE detecting the particular cell of the multiple co-located cells provided by the second base station, the UE uses the second base station's carrier-aggregation policy for the particular cell as a basis to control cell reselection.

As discussed above, in one example, for each cell of the multiple co-located cells, the respective carrier-aggregation policy may specify whether the cell is configured to be a PCell carrier-aggregated with another one of the multiple co-located cells. In this situation, the UE may be arranged to perform cell reselection in a manner depending on whether the particular cell is configured to be a PCell or rather an SCell.

Additionally, in a further example, for each cell of the multiple co-located cells that is configured to be a PCell, the respective carrier-aggregation policy may further specify an extent to which the cell is configured to be carrier-aggregated with one or more other cells of the multiple co-located cells. In this situation, the UE may be arranged to perform cell reselection in a manner depending on the extent to which the particular cell is configured to be carrier-aggregated with one or more other cells of the multiple co-located cells.

Exemplary embodiments have been described above. It should be understood, however, that variations from these embodiments are possible, while remaining within the scope of the invention.

We claim:

1. A method operable in a radio access network comprising a first base station and a second base station, wherein the second base station provides multiple co-located cells each operating on a respective carrier, wherein the multiple co-located cells include a first cell and a second cell, and wherein, for each cell of the multiple co-located cells, the second base station imposes a respective carrier-aggregation policy that defines an extent to which the cell, when used as a primary cell (PCell), can be aggregated with secondary cell bandwidth, the method comprising:

receiving, by the first base station, from the second base station, policy information indicating the carrier-aggregation policy that the second base station imposes respectively per cell, wherein the carrier-aggregation policy for the first cell is that, when the first cell is used as a PCell, the first cell can be aggregated with a first extent of secondary cell bandwidth, and wherein the carrier-aggregation policy for the second cell is that, when the second cell is used as a PCell, the second cell can be aggregated with a second extent of secondary cell bandwidth;

while the first base station is serving a user equipment device (UE), receiving, by the first base station, from the UE, a report that the UE has detected coverage of the first cell provided by the second base station; and responsive to receiving the report, the first base station (i) determining, based on the received policy information, which of the first cell and second cell, when used as a PCell, can be aggregated with a greater extent of secondary cell bandwidth, and (ii) invoking handover of the UE to the determined cell.

2. The method of claim 1, wherein receiving by the first base station, from the second base station, the policy information occurs over an X2 interface between the first base station and the second base station.

3. The method of claim 1:
wherein the first extent of secondary cell bandwidth comprises a first number of secondary cells (SCells) that can be aggregated with the first cell, and wherein the second extent of secondary cell bandwidth comprises a second number of SCells that can be aggregated with the second cell.

4. The method of claim 1:
wherein the first extent of secondary cell bandwidth comprises a first bandwidth of one or more secondary cells (SCells) that can be aggregated with the first cell, and wherein the second extent comprises a second bandwidth of one or more SCells that can be aggregated with the second cell.

5. The method of claim 1, further comprising broadcasting, by the first base station, to the UE, the received policy information to enable the UE to use the policy information as a basis to control handover of the UE.

6. A base station comprising:
an antenna structure for wirelessly communicating with user equipment devices (UEs);
a network communication interface through which the base station is configured to receive carrier-aggregation policies from another base station; and
a controller,
wherein the other base station provides multiple co-located cells each operating on a respective carrier, the multiple co-located cells including a first cell and a second cell,
wherein the received carrier-aggregation policies define, for each cell of the multiple co-located cells, an extent to which the cell, when used as a primary cell (PCell), can be aggregated with secondary cell bandwidth,
wherein the carrier-aggregation policy for the first cell is that, when the first cell is used as a PCell, the first cell can be aggregated with a first extent of secondary cell bandwidth,
wherein the carrier-aggregation policy for the second cell is that, when the second cell is used a PCell, the second cell can be aggregated with a second extent of secondary cell bandwidth, and
wherein the controller is arranged to:
receive, from a UE being served by the base station, a report that the UE has detected coverage of the first cell provided by the other base station, and
responsive to receiving the report, (i) determine, based on the received carrier-aggregation policies, which of the first cell and the second cell, when used as a PCell, can be aggregated with a greater extent of secondary cell bandwidth, and (ii) invoke handover of the UE to the determined cell.

7. The base station of claim 6, wherein the base station receives the other base station's carrier-aggregation policies via an X2 interface between the base station and the other base station.

8. The base station of claim 6, wherein the controller comprises a processor, data storage, and program instructions stored in the data storage and executable by the processor to use the other base station's carrier aggregation policies for the first cell and the second to control the handover of the UE.

9. The base station of claim 6, wherein the controller is further arranged to cause the base station to broadcast the received carrier-aggregation policies to the UE to enable the UE to use the other base station's carrier-aggregation policy for one or more of the multiple co-located cells as a basis to control the handover of the UE.

10. The base station of claim 6:

wherein the first extent of secondary cell bandwidth comprises a first number of secondary cells (SCells) that can be aggregated with the first cell, and wherein the second extent of secondary cell bandwidth comprises a second number of SCells that can be aggregated with the second cell.

11. The base station of claim 6:

wherein the first extent of secondary cell bandwidth comprises a first bandwidth of one or more secondary cells (SCells) that can be aggregated with the first cell, and wherein the second extent comprises a second bandwidth of one or more SCells that can be aggregated with the second cell.

12. A method implemented by a user equipment device (UE) in a wireless communication system, wherein the wireless communication system comprises a first base station and a second base station, wherein the second base station provides multiple co-located cells each operating on a respective carrier, wherein the multiple co-located cells include a first cell and a second cell, and wherein, for each cell of the multiple co-located cells, the second base station imposes a respective carrier-aggregation policy that defines an extent to which the cell, when used as a primary cell (PCell), can be aggregated with secondary cell bandwidth, the method comprising:

receiving by the UE, from the first base station, policy information indicating the carrier-aggregation policy that the second base station imposes respectively per cell, wherein the carrier-aggregation policy for the first cell is that, when the first cell is used as a PCell, the first cell can be aggregated with a first extent of secondary cell bandwidth, and wherein the carrier-aggregation policy for the second cell is that, when the second cell is used as PCell, the second cell can be aggregated with a second extent of secondary cell bandwidth;

while the UE is being served by the first base station, detecting by the UE coverage of the first cell provided by the second base station; and responsive to the detecting coverage of the first cell, the UE (i) determining, based on the received policy information, which of the first cell and second cell, when used as a PCell, can be aggregated with a greater extent of secondary cell bandwidth, and (ii) attaching to the determined cell.

13. The method of claim 12, wherein receiving by the UE, from the first base station, the policy information occurs over a radio frequency (RF) air interface provided by the first base station.

14. The method of claim 12:

wherein the first extent of secondary cell bandwidth comprises a first number of secondary cells (SCells) that can be aggregated with the first cell, and wherein the second extent of secondary cell bandwidth comprises a second number of SCells that can be aggregated with the second cell.

15. The method of claim 12:

wherein the first extent of secondary cell bandwidth comprises a first bandwidth of one or more secondary cells (SCells) that can be aggregated with the first cell, and wherein the second extent comprises a second bandwidth of one or more SCells that can be aggregated with the second cell.

* * * * *